A. APFEL.
SANITARY SUGAR SERVER.
APPLICATION FILED APR. 22, 1921.
1,430,876.
Patented Oct. 3, 1922.
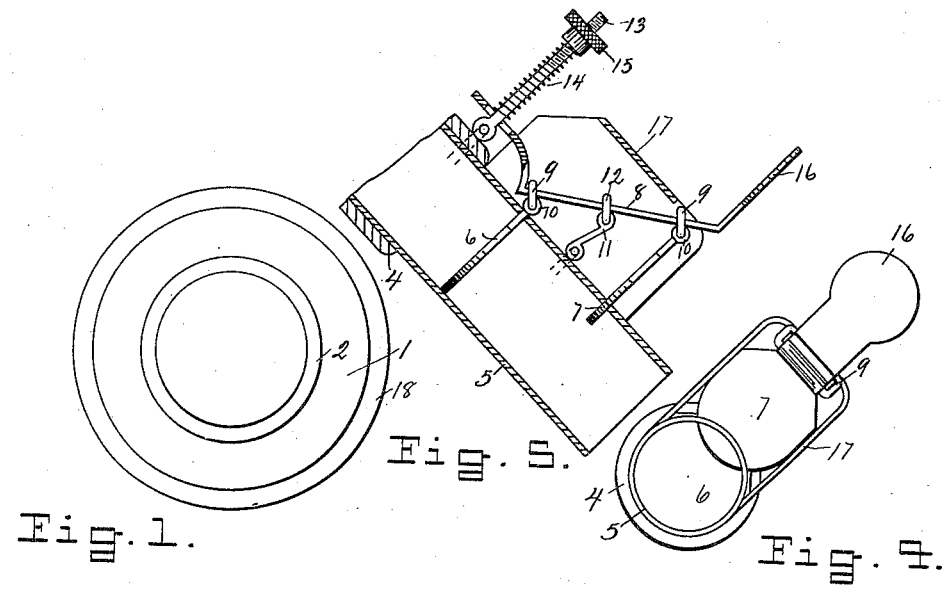
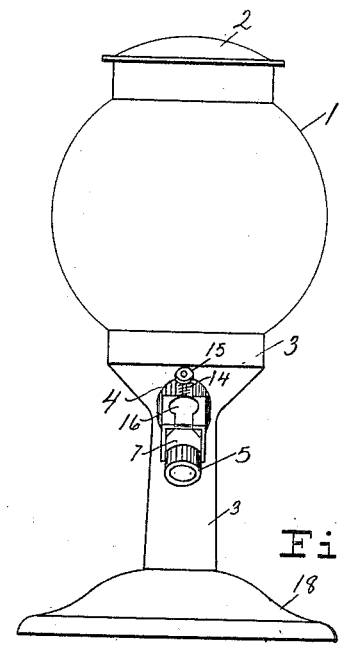
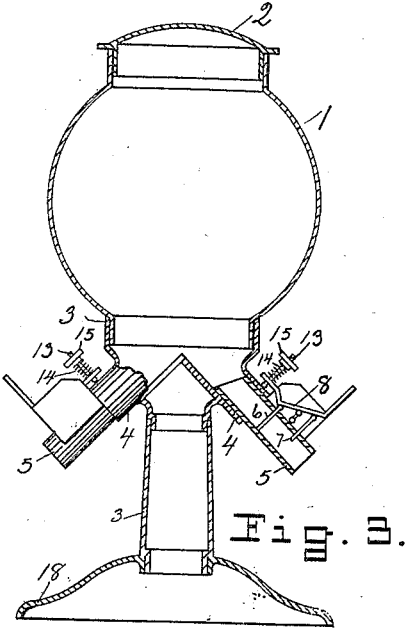
WITNESSES.
Frances French
Bertha Falk
INVENTOR.
ADAM APFEL.
BY Charles Albert French.
ATTORNEY.

Patented Oct. 3, 1922.

1,430,876

UNITED STATES PATENT OFFICE.

ADAM APFEL, OF EVANSVILLE, WISCONSIN, ASSIGNOR, BY MESNE ASSIGNMENTS, OF ONE-HALF TO MICHAEL SKODA, OF OAK PARK, ILLINOIS.

SANITARY SUGAR SERVER.

Application filed April 22, 1921. Serial No. 463,642.

*To all whom it may concern:*

Be it known that I, ADAM APFEL, citizen of the United States, residing at Evansville, in the county of Rock and State of Wisconsin, have invented certain new and useful Improvements in Sanitary Sugar Servers, of which the following is a specification.

My invention relates to sanitary sugar servers for restaurants, lunch counters, etc.

The principal object of my invention is to provide a sanitary container for sugar which will exclude dust, flies, insects, etc., and also prevent waste.

A further object of the invention is to provide means for conveniently discharging the sugar by means of removable tubes and chutes whereby one teaspoonsful at a time may be dispensed.

A still further object is to provide a device that is simple in construction as well as pleasing in design and appearance.

The uses and advantages of my invention will be readily apparent from the following description, reference being had to the accompanying drawings in which—

Fig. 1 is a plan.

Fig. 2 is a front elevation.

Fig. 3 is a vertical section on line A—B.

Fig. 4 is an enlarged front elevation of charger and tube.

Fig. 5 is a partial section of same.

Similar numerals refer to similar parts throughout the several views.

The container 1, is constructed preferably of glass open at the top and bottom, the top opening for filling, which is provided with a cover 2; and the bottom opening for attaching to the column 3, and allowing the sugar to pass into the chutes 4. Tubes 5, are adapted to fit into the lower ends of the chutes and be secured by friction or any suitable connection, and chargers, comprising slidable plates 6 and 7, disposed in the slots in the tubes 5, and are connected to a lever 8, by loops 9, passing through eyes 10, in the top of the plates. A connecting lever 11, hingedly secured to the tubes 5, intermediate the plates 6 and 7, carries a loose link 12, which will adjust itself to the different positions of the lever 8, as the plates are raised and lowered thus permitting the sugar to pass through the tubes. A threaded eye bolt 13, is hinged to the top and lower end of the chutes, and passes through an aperture in the inner end of the lever and is provided with a spring 14 which is mounted on the same between the lever 8, a thumb nut 15 is provided, for adjusting the pressure applied to the lever at the rear end. The front end of said lever is turned upward and terminates in a round portion 16, convenient for operating. A base 18 preferably round is in form attached to the lower end of the column 3, thereby making the whole a sanitary and convenient device for the purpose described. A casing 17, partly covers the movable parts, and is secured to the sides of the tubes.

To use my device, fill the container 1, with sugar and discharge, one spoonful at a time by pressing forward the lever at 16, which will raise plate 6, and lower plate 7, thereby allowing the sugar to pass plate 6, and lodge against plate 7, at the same time compressing the spring 14, and when the lever is released the spring will raise plate 7 and close plate 6, discharging the sugar remaining between them.

Having thus described my invention, I claim—

1. In a sanitary sugar server comprising a container open at the top and bottom, a closure for the top thereof, a column attached to the bottom of said container and provided with chutes equi-spaced peripherally of the column below the juncture of said column and container, said chutes declining outward at an angle to said column, tubes secured within the lower end of said chutes, slots disposed transversely of the tubes, plates slidably disposed within said slots, a lever hingedly secured between the plates aforesaid and to the top of said tubes, eyes formed integral with the top of said plates, links disposed in said eyes and adapted to engage the lever, adjustable tension means for holding said lever in closed position.

2. In a sanitary sugar server comprising a container open at the top and bottom, a closure for the top thereof, a column provided with a cone-shaped portion at the top and attached to the bottom of said container, chutes oppositely disposed on said column below said cone-shaped portion, said chutes projecting outward at an angle to said column, tubes secured within the lower end of said chutes, transverse slots disposed in said tubes, plates slidably disposed in said slots, a lever hingedly secured between said plates and to the top of said tube, eyes integral with the top of said plates, adjustable means connecting said eyes and said lever and adapted to hold said lever in closed position.

In testimony whereof I affix my signature in the presence of two subscribing witnesses.

ADAM APFEL.

Witnesses:
   FRANCES FRENCH,
   Mrs. P. C. FALK.